(12) United States Patent
Milanovic et al.

(10) Patent No.: US 11,074,214 B2
(45) Date of Patent: Jul. 27, 2021

(54) DATA PROCESSING (71) Applicant: Arm Limited, Cambridge (GB)

(72) Inventors: Jelena Milanovic, Antibes (FR); Lee Evan Eisen, Round Rock, TX (US); Nigel John Stephens, Cambridge (GB)

(73) Assignee: Arm Limited, Cambridge (GB)

( * ) Notice: Subject to any disclaimer, the term of this patent is extended or adjusted under 35 U.S.C. 154(b) by 80 days.

(21) Appl. No.: 16/531,210

(22) Filed: Aug. 5, 2019

(65) Prior Publication Data

US 2021/0042261 A1   Feb. 11, 2021

(51) Int. Cl.
*G06F 9/30* (2018.01)
*G06F 15/80* (2006.01)

(52) U.S. Cl.
CPC ...... *G06F 15/8092* (2013.01); *G06F 9/30145* (2013.01)

(58) Field of Classification Search
CPC .......... G06F 15/8092; G06F 9/30145
See application file for complete search history.

(56) References Cited

U.S. PATENT DOCUMENTS

| 5,887,183 | A | 3/1999 | Agarwal et al. | |
|---|---|---|---|---|
| 8,782,621 | B2 * | 7/2014 | Slavin | G06F 9/5016 717/140 |
| 2005/0108503 | A1 | 5/2005 | Sandon et al. | |

FOREIGN PATENT DOCUMENTS

| GB | 2540940 | 2/2017 | |
|---|---|---|---|
| WO | WO-2014188210 A1 * | 11/2014 | ............ G06F 21/43 |

OTHER PUBLICATIONS

International Search Report and Written Opinion of the International Searching Authority for PCT/GB2020/050813 dated Jun. 30, 2020, 12 pages.

* cited by examiner

*Primary Examiner* — Cheng Yuan Tseng
(74) *Attorney, Agent, or Firm* — Nixon & Vanderhye P.C.

(57) ABSTRACT

Data processing apparatus comprises processing circuitry to apply processing operations to one or more data items of a linear array comprising a plurality, n, of data items at respective positions in the linear array, the processing circuitry being configured to access an array of n×n storage locations, where n is an integer greater than one, the processing circuitry comprising: instruction decoder circuitry to decode program instructions; and instruction processing circuitry to execute instructions decoded by the instruction decoder circuitry; wherein the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction.

13 Claims, 10 Drawing Sheets

BjHk · MMLA16 Cm.S, AjVk.S, BjHk.S

AjVk    Cm

DATA PROCESSING

BACKGROUND

This disclosure relates to data processing.

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

SUMMARY

In an example arrangement there is provided data processing apparatus comprising: processing circuitry to apply processing operations to one or more data items of a linear array comprising a plurality, n, of data items at respective positions in the linear array, the processing circuitry being configured to access an array of n×n storage locations, where n is an integer greater than one, the processing circuitry comprising:

instruction decoder circuitry to decode program instructions; and instruction processing circuitry to execute instructions decoded by the instruction decoder circuitry;

wherein the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction.

In another example arrangement there is provided data processing apparatus comprising:

processing means for applying processing operations to one or more data items of a linear array comprising a plurality, n, of data items at respective positions in the linear array, the vector processing means being operable to access an array of n×n storage locations, where n is an integer greater than one, the processing means comprising:

instruction decoder means for decoding program instructions; and instruction processing means for executing instructions decoded by the instruction decoder means;

wherein the instruction decoder means is responsive to an array access instruction, to control the instruction processing means to access, as a linear array, a set of n storage locations arranged in an array direction selected, under control of the array access instruction, from a set of candidate array directions comprising at least a first array direction and a second array direction different to the first array direction.

In another example arrangement there is provided a data processing method comprising:

applying processing operations to one or more data items of a linear array comprising a plurality, n, of data items at respective positions in the linear array, by accessing an array of n×n storage locations, where n is an integer greater than one, the applying step comprising:

decoding program instructions; and executing instructions decoded by the decoding step;

wherein the decoding step is responsive to an array access instruction, to control the executing step to access, as a linear array, a set of n storage locations arranged in an array direction selected, under control of the array access instruction, from a set of candidate array directions comprising at least a first array direction and a second array direction different to the first array direction.

In another example arrangement there is provided a virtual machine comprising a data processor to execute a computer program comprising machine readable instructions, wherein execution of the computer program causes the data processor to operate as a data processing apparatus comprising:

processing circuitry to apply processing operations to one or more data items of a linear array comprising a plurality, n, of data items at respective positions in the linear array, the processing circuitry being configured to access an array of n×n storage locations, where n is an integer greater than one, the processing circuitry comprising:

instruction decoder circuitry to decode program instructions; and instruction processing circuitry to execute instructions decoded by the instruction decoder circuitry;

wherein the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction.

Further respective aspects and features of the disclosure are defined by the appended claims.

BRIEF DESCRIPTION OF THE DRAWINGS

The present technique will be described further, by way of example only, with reference to embodiments thereof as illustrated in the accompanying drawings, in which:

FIGS. 2b to 4 schematically illustrate accesses to the storage array of FIG. 2b;

DESCRIPTION OF EMBODIMENTS

Before discussing the embodiments with reference to the accompanying figures, the following description of embodiments is provided.

An example embodiment provides data processing apparatus comprising:

processing circuitry to apply processing operations to one or more data items of a linear array comprising a plurality, n, of data items at respective positions in the linear array, the processing circuitry being configured to access an array of n×n storage locations, where n is an integer greater than one, the processing circuitry comprising:

instruction decoder circuitry to decode program instructions; and instruction processing circuitry to execute instructions decoded by the instruction decoder circuitry;

wherein the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction.

The example embodiments represent techniques which may provide particular efficiency and convenience in array processing. An example relates to matrix processing, but the techniques are useable in other applications.

The multiplication or other manipulation of matrices is often found in digital signal processing used by many application areas. And in recent years, with the increased penetration of machine learning where the multiplication of matrices is found in training and inference algorithms, the interest in the acceleration of matrix multiplication processing is enormous.

For example, for two matrices A and B, where matrix A is with dimensions [M, K] and matrix B is with dimensions [K, N], the matrix C=A*B is with dimensions [M, N], where M is the number of rows of both A and C, K is the number of columns of A and a number or rows of B, and N is the number of columns of both B and C.

Even though the matrix multiplication computation is quite simple, i.e. each element of C is obtained by K-way dot-product of one row of A and one column of B, and this computation may be considered as K multiply-accumulate operations, the challenge lies in delivering to instruction inputs sequences of particular elements of matrices A and B contributing to particular results in a specific order mandated by the instruction which will use this data to compute the result. The present embodiments are related to delivering adequately organized input matrix elements, for example (though not exclusively) when the computation is performed on vector processing CPUs.

Usually in the generic application frameworks that are not customized for one implementation, the memory layout of three matrices A, B and C is the same, either all are in a row-major memory layout or all three matrices are in a column-major memory layout. The challenge in effectively delivering elements of A matrix and B matrix contributing to a particular result as inputs to a CPU instruction that will process them lies in that the data arrangement in memory may be the same, while what is required is one row of A and one column of B. If A and B matrices have the same memory layout there will always be one of A or B whose data would need to be delivered contiguously taken from memory, while data of the other matrix would have to be collected from discontiguous locations in memory.

In examples of the present techniques, the challenges of the multiplication of matrices found in generic, non-customized application frameworks, are addressed at least in part by providing an effective mechanism for delivering input matrix elements as linear arrays for any combination of memory layouts of input matrices. There are four combinations: both A and B are in a row-major memory layout, both A and B input matrices are in a column-major memory layout, A is in a row-major memory layout and B is in a column-major memory layout, A is in a column-major memory layout and B is in a row-major memory layout.

These features can be achieved by example embodiments in which data can be written into, and read from, the n×n array of storage locations as linear arrays of n data items in one of at least two different directions such as orthogonal directions.

Example embodiments can provide storage arrays, where each array can be viewed as both n horizontal linear arrays and n vertical linear arrays. Processing circuitry taking input data from the storage array, can read the array in two directions: in the same direction as a load populated the array, or in another direction such as a second direction orthogonal to that direction. If an instruction is used such that it reads the array in the same direction as a load populated the array, then the instruction is consuming inputs in its native layout in memory. On the other hand, if an instruction is used such that it reads the array in the direction orthogonal to the direction in which the load populated the array, then the instruction is consuming inputs in the transposed form versus its native layout in memory. This leads to the enablement of an "On-the-fly transpose capability" with the proposed technique.

In examples as mentioned above, the second array direction is orthogonal to the first array direction.

In some examples, the instruction processing circuitry is configured to store an input vector to the array of storage locations as a group of n storage locations arranged in the first array direction; and is responsive to a data retrieval instruction, to retrieve, as a linear array, a set of n storage locations arranged in an array direction selected, under control of the data retrieval instruction, from the set of candidate array directions; and the first array direction is a predetermined array direction.

In general, although the array direction may be implied or separate instructions may be used in respect of each access direction, the data retrieval instruction may have an associated instruction parameter to specify an array direction by which the instruction processing circuitry accesses (in examples, retrieves), as a linear array, a set of n storage locations.

Conveniently, for example to allow processing operations to be conducted between them, the data processing apparatus may comprise two or more arrays of n×n storage locations.

In some examples, the techniques are particularly useful in respect of an array access instruction comprising a matrix processing instruction defining a matrix processing operation to generate output data in dependence upon respective input matrices of data items stored in respective ones of the two or more arrays of n×n storage locations. For example, the matrix processing operation may define an operation between rows or columns of data items of one of the input matrices and rows or columns of data items of another of the input matrices; and the matrix processing instruction may have an associated instruction parameter to specify, for each of the respective arrays of n×n storage locations storing the input matrices of data items, an array direction by which the instruction decoder circuitry is to control the instruction processing circuitry to retrieve linear arrays from the array of storage locations.

In example arrangements the matrix processing operation is a matrix multiplication operation to generate an element of an output matrix in dependence upon an operation between elements of one of rows and columns of data items of one of the input matrices and the other of rows and columns of data items of another of the input matrices.

Conveniently, the array of n×n storage locations comprises an array of storage elements accessible by the instruction processing circuitry as 2n linear arrays, the 2n linear arrays comprising n linear arrays in the first array direction and n linear arrays in the second array direction, each linear array containing n data items. For example, the array access instruction may specify one or more of the 2n linear arrays. In some example embodiments (though not exclusively) the linear arrays may be accessible as vector registers.

The number n may be any value, and may be related to the overall size of the storage allocated to the array and a granularity of access, but in an example n is equal to 16.

Another example embodiment provides data processing apparatus comprising:

processing means for applying processing operations to one or more data items of a linear array comprising a plurality, n, of data items at respective positions in the linear array, the processing means being operable to access an array of n×n storage locations, where n is an integer greater than one, the processing means comprising:

instruction decoder means for decoding program instructions; and instruction processing means for executing instructions decoded by the instruction decoder means;

wherein the instruction decoder means is responsive to an array access instruction, to control the instruction processing means to access, as a linear array, a set of n storage locations arranged in an array direction selected, under control of the array access instruction, from a set of candidate array directions comprising at least a first array direction and a second array direction different to the first array direction.

Another example embodiment provides a data processing method comprising:

applying processing operations to one or more data items of a linear array comprising a plurality, n, of data items at respective positions in the linear array, by accessing an array of n×n storage locations, where n is an integer greater than one, the applying step comprising:

decoding program instructions; and executing instructions decoded by the decoding step;

wherein the decoding step is responsive to an array access instruction, to control the executing step to access, as a linear array, a set of n storage locations arranged in an array direction selected, under control of the array access instruction, from a set of candidate array directions comprising at least a first array direction and a second array direction different to the first array direction.

Example embodiments may be implemented as computer software which, when executed by a computer, causes the computer to carry out the method defined above. Such software may be provided by a non-transitory machine readable storage medium which stores such computer software.

Another example embodiment provides a virtual machine comprising a data processor to execute a computer program comprising machine readable instructions, wherein execution of the computer program causes the data processor to operate as a data processing apparatus comprising:

processing circuitry to apply processing operations to one or more data items of a linear array comprising a plurality, n, of data items at respective positions in the linear array, the processing circuitry being configured to access an array of n×n storage locations, where n is an integer greater than one, the processing circuitry comprising:

instruction decoder circuitry to decode program instructions; and instruction processing circuitry to execute instructions decoded by the instruction decoder circuitry;

wherein the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction.

Figure 1:
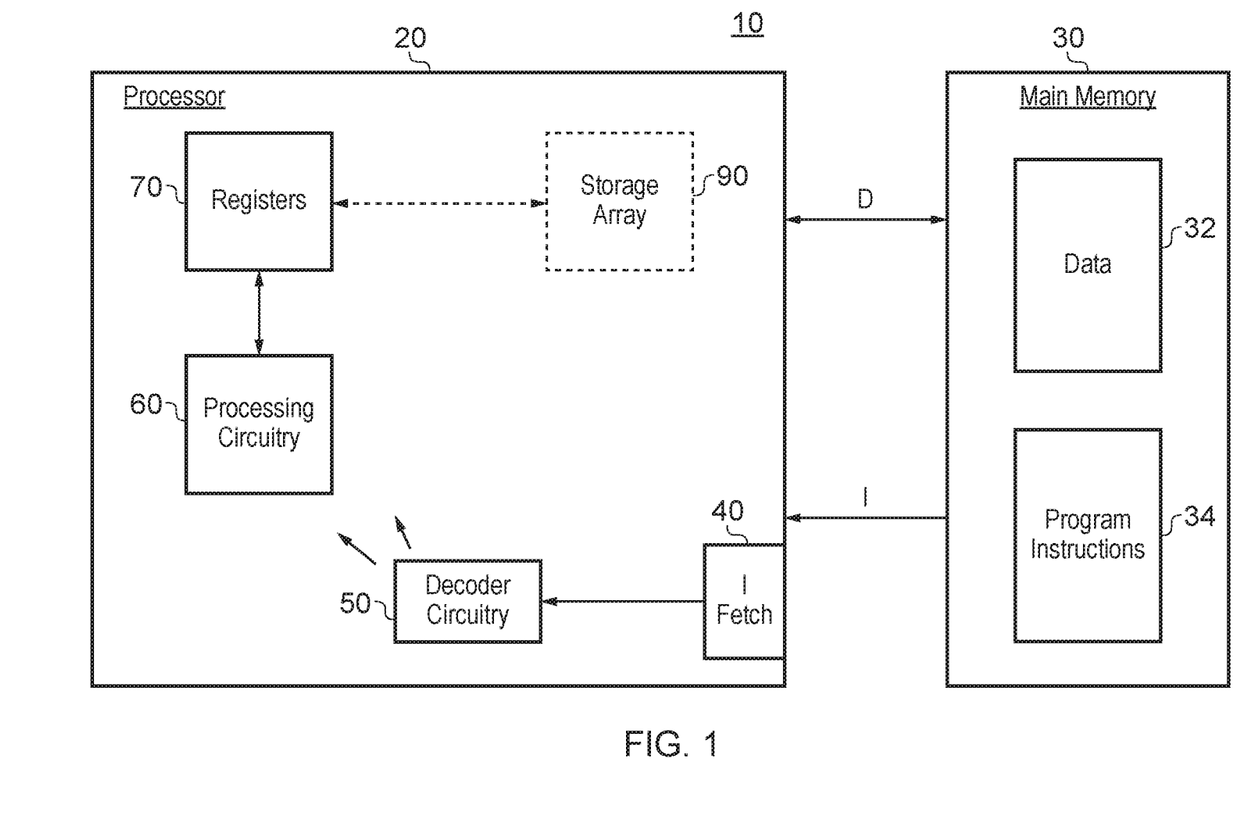
FIG. 1 schematically illustrates a data processing apparatus.

Referring now to the drawings, FIG. 1 schematically illustrates a data processing system 10 comprising a processor 20 coupled to a memory 30 storing data values 32 and program instructions 34. The processor 20 includes an instruction fetch unit 40 for fetching program instructions 34 from the memory 30 and supplying the fetch program instructions to decoder circuitry 50. The decoder circuitry 50 decodes the fetched program instructions and generates control signals to control processing circuitry 60 to perform processing operations upon registers stored within register circuitry 70 as specified by the decoded vector instructions.

The processor 20 can access a storage array 90. This is drawn in broken line to illustrate that it may or may not be provided as part of the processor 20. In various examples, the storage array can be implemented as any one or more of the following: architecturally-addressable registers; non-architecturally-addressable registers; a scratchpad memory; and a cache.

The processing circuitry 60 may be, for example vector processing circuitry and/or scalar processing circuitry. A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors. Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

While the present embodiments may be relevant to vector processing, it is not a requirement that a vector processor is used. Instead, the present techniques relate to processing two dimensional arrays of data items, stored in for example the storage array 90. The two-dimensional storage arrays may, in at least some examples, be accessed as one-dimensional arrays of data items in multiple candidate directions. While such a one-dimensional array of data items may be handled in some examples as a data vector, this is not an essential requirement of the present techniques.

In example embodiments, the storage array 90 may store a square array portion of a larger or even higher-dimensioned array or matrix of data items in memory.

Multiple instances of the storage array 90 may be provided so as to store multiple respective arrays of data items.

The discussion below relates to example program instructions 34. Embodiments of the present disclosure include an apparatus, for example of the type shown in FIG. 1, operable or configured to decode and execute such program instructions. FIG. 1 therefore provides an example of processing circuitry to selectively apply a processing operation to data items at positions within linear arrays, each linear array comprising a plurality of data items having a data item order, the processing circuitry comprising instruction decoder circuitry to decode program instructions; and instruction processing circuitry to execute instructions decoded by the instruction decoder circuitry; wherein the instruction decoder circuitry is responsive to instructions to control the instruction processing circuitry to carry out functionality to be discussed below.

Optionally, where a vector processor is in use, the vector processing operations may be under the control of so-called predicates. Here, a respective predicate can control whether or not a particular vector function is applied in respect of one of the data item positions within the linear arrays (which could be treated as data vectors in this example arrangement).

As discussed above, the processing circuitry 60 is arranged, under control of instructions decoded by decoder circuitry 50, to access the registers 70 and/or the storage array 90. Further details of this latter arrangement will now be described with reference FIG. 2a.

Figure 2A:
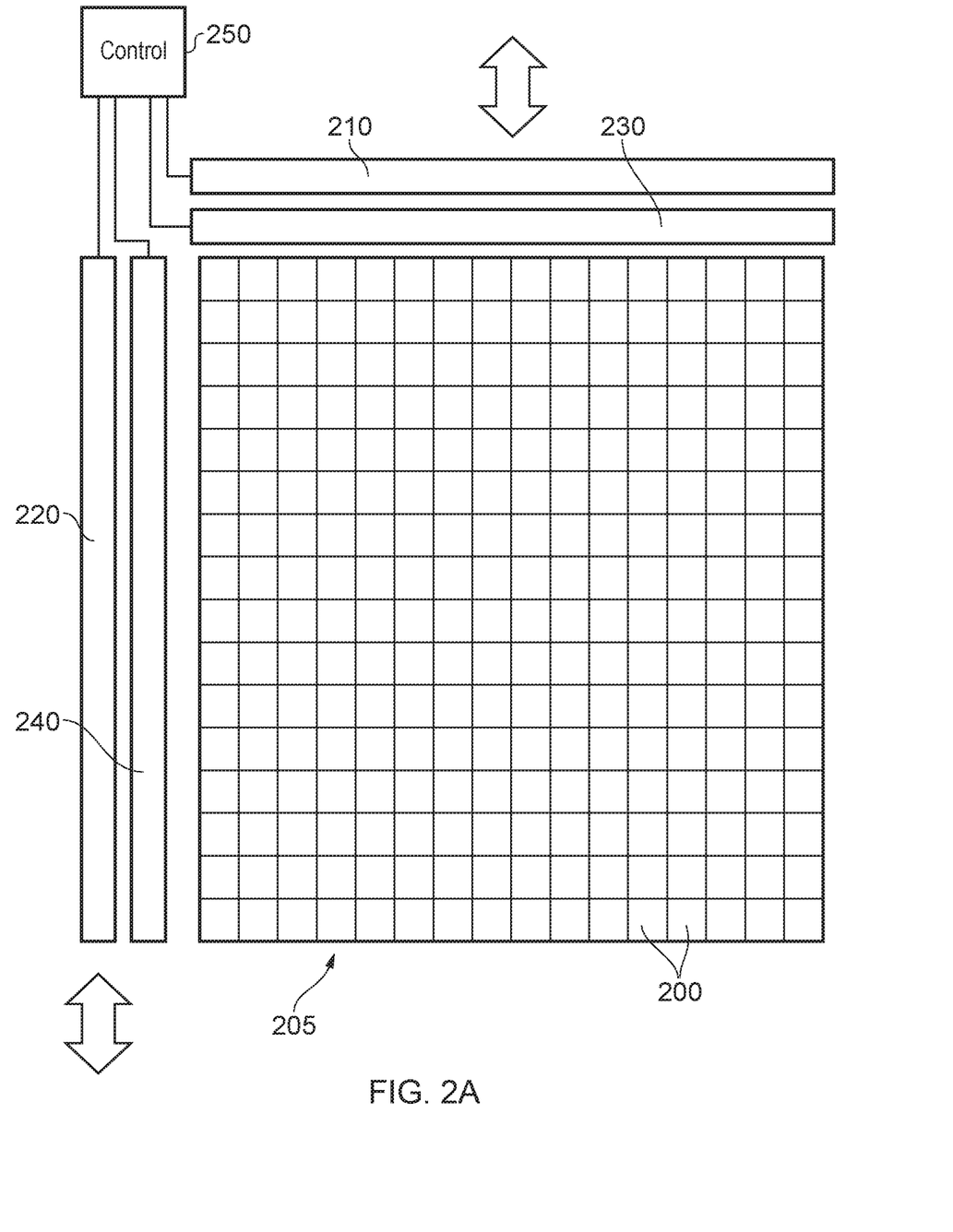
FIGS. 2a schematically illustrates a storage array.

In the present examples, the storage array 90 is arranged as an array 205 of n×n storage locations 200, where n is an integer greater than 1. In the present example, n is 16 which implies that the granularity of access to the storage locations 200 is $\frac{1}{16}^{th}$ of the total storage in either horizontal or vertical array directions. This aspect will be discussed further below.

From the point of view of the processing circuitry, the array of n×n locations are accessible as n linear (one-dimensional) arrays in a first direction (for example, a horizontal direction as drawn) and n linear arrays in a second array direction (for example, a vertical direction as drawn). Each linear array has n elements so that each of the storage arrays stores a linear array of n data items. In other words, the n×n storage locations are arranged or at least accessible, from the point of view of the processing circuitry 60, as 2n linear array, each of n data items.

Therefore, this provides an example in which the array of n×n storage locations comprises an array of storage elements accessible by the instruction processing circuitry as 2n linear arrays, the 2n linear arrays comprising n linear arrays in the first array direction and n linear arrays in the second array direction, each linear array containing n data items (for example, though this is not a requirement, as a data vector register. The example instructions discussed below may specify one or more of the 2n linear arrays.

The array of storage locations 200 is accessible by access circuitry 210, 220, column selection circuitry 230 and row selection circuitry 240, under the control of control circuitry 250 in communication with at least the processing circuitry and optionally with the decoder circuitry 50.

Figure 2B:
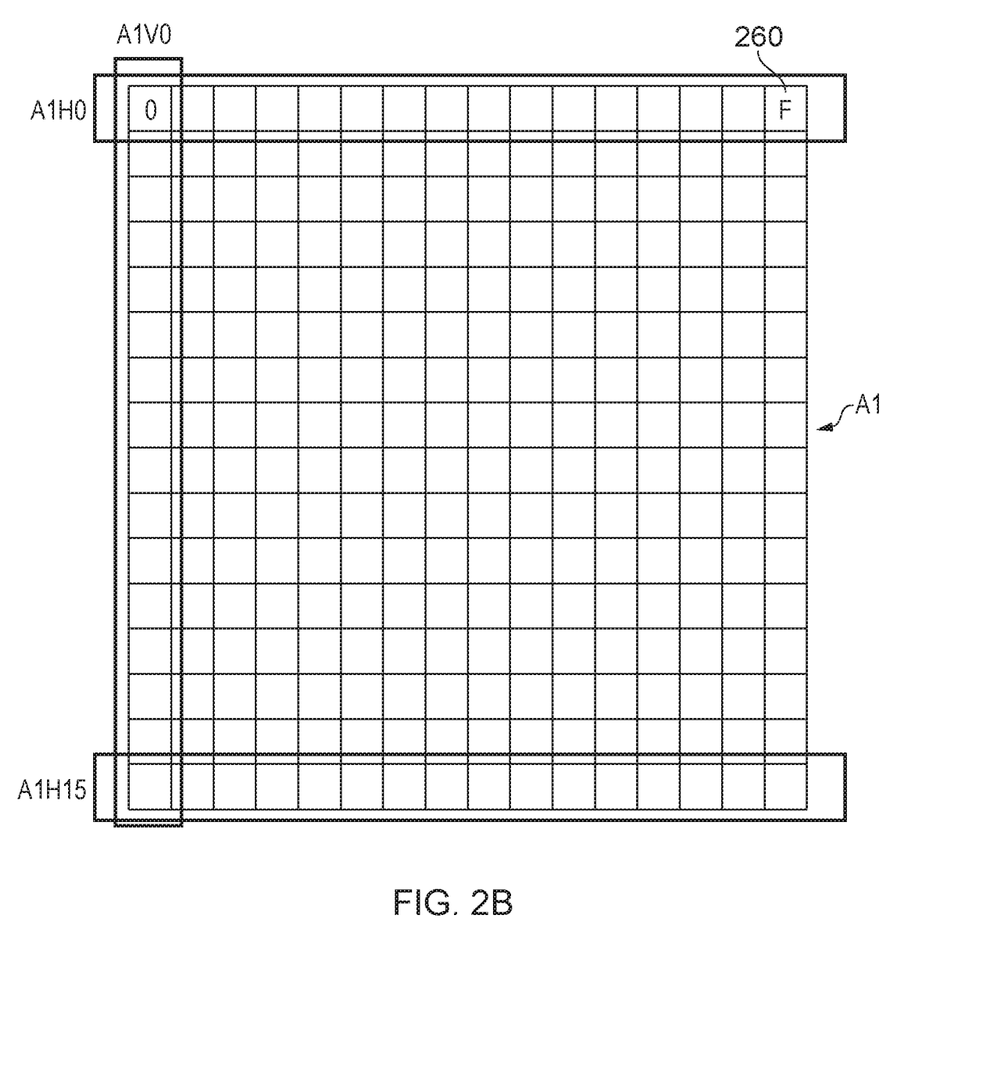

With reference to FIG. 2b, the n linear arrays in the first direction (a horizontal or "H" direction as drawn), in the case of an example storage array 90 designated as "A1" (noting that as discussed below, there could be more than one such storage array 90 implemented, for example A0, A1, A2 and so on) are each of 16 data items 0 . . . F (in hexadecimal notation) and may be referenced in this example as A1H0 . . . A1 H15. The same underlying data, stored in the 256 entries (16×16 entries) of the storage array 90 A1 of FIG. 2b, may instead be referenced in the second direction (a vertical or "V" direction as drawn) as A1V0 . . . A1V15. Note that, for example, a data item 260 is referenced as item F of A1H0 but item 0 of A1V15. Note that the use of "H" and "V" does not imply any spatial or physical layout requirement relating to the storage of the data elements making up the storage array 90, nor does it have any relevance to whether the storage arrays store row or column data in an example application involving matrix processing.

The apparatus of FIGS. 1 and 2a, operating in accordance with the techniques of FIG. 2b, provides an example of data processing apparatus 10 comprising:

processing circuitry 20 to apply processing operations to one or more data items of a linear array comprising a plurality, n, of data items at respective positions in the linear array, the processing circuitry being configured to access an array 205 of n×n storage locations 200, where n is an integer greater than one, the processing circuitry comprising:

instruction decoder circuitry 50 to decode program instructions; and instruction processing circuitry 60 to execute instructions decoded by the instruction decoder circuitry;

wherein the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction.

In example arrangements second array direction (vertical as drawn in FIG. 2a) is orthogonal to the first array direction (horizontal as drawn).

In order to access one of the linear arrays A1H0 . . . A1H15 in the first direction, for example the horizontal direction as drawn, reference is made to FIG. 3 in which an arbitrary linear array A1Hm 300 (where m is an arbitrary number between 0 and 15 in this example) is being accessed. Here, the row selection circuitry 240 is controlled by the control circuitry 250 to select the row of storage locations corresponding to the linear array 300, and the access circuitry 210 controls access (input or output) out of individual data items 310 of the linear array 300 to be provided via an interface 320 to the processing circuitry.

Figure 4:
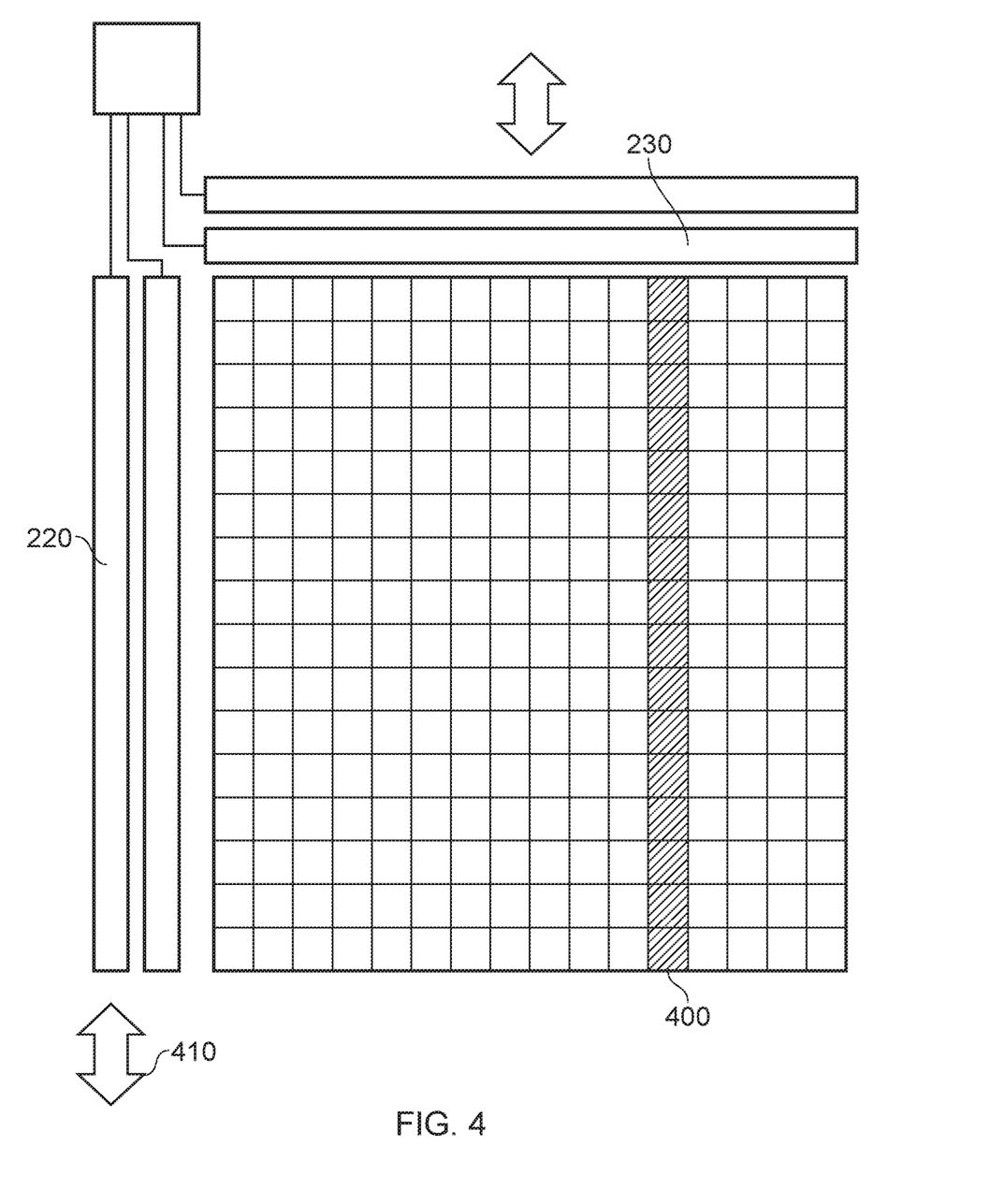

Similarly, with reference to FIG. 4, in order to access an arbitrary linear array in the other direction as drawn, such as a linear array A1Vm 400, the column selection circuitry 230 selects the column of storage elements corresponding to the linear array 400 and data is read (output) via the access circuitry 220 to be interfaced with the processing circuitry by an interface 410.

The so-called granularity of the arrangement of FIGS. 2a-4 will now be discussed. A linear array A1Hm represents 16 data items each of 32 bits. There are 16 such linear arrays, and each linear array A1Vm in the second array direction also has 16 entries of 32 bits. Instead, however, this storage could be arranged as (say) a vector of 64 data items of 8 bits in each direction. In other words the granularity of access to the storage which provides the storage array 90 could be a granularity of 8 bits rather than a granularity of 32 bits. However, in the present examples, the granularity and the number of data items in each linear array in the first and second directions should be the same (16 in the first example, 64 in the second example).

In example arrangements the instruction processing circuitry 60 is configured to store an input vector or linear array to the array of storage locations as a group (A1Hm) of n storage locations arranged in the first array direction; and is responsive to a data retrieval instruction, to retrieve, as a linear array, a set of n storage locations arranged in an array direction (A1Hm or A1Vm for example) selected, under control of the data retrieval instruction, from the set of candidate array directions; and the first array direction is a predetermined array direction (for example, horizontal as drawn). In other words, data writes are constrained to the first direction whereas data reads are allowed in either direction. But of course, another example arrangement could be provided in which data writes and data reads are allowed in either direction.

Examples of processing instructions which may be used to access the storage array(s) 90 as represented by FIGS. 2a-4 may include one or more of the following:

(a) Load and store instructions specifying for example:
    a linear array (or a set of linear arrays) in one of the storage arrays 90 (A1Hm in the above example);
    a block of memory locations as the source or destination of the operation;

optionally (in the example case of vector processing circuitry) a predicate register defining whether the operation is carried out for each memory location;

optionally a parameter defining the granularity of access (see above)

(b) Move instructions providing a copy or transpose function and specifying for example:

a source linear array (or a source set of linear arrays) in one of the storage arrays 90 (A1Hm or A1Vm in the above example), or an initialization value;

a target linear arrays (or a target set of linear arrays) in another (different) one of the arrays (A1Hm or A1Vm in the above example);

optionally a parameter defining the granularity of access (see above)

(c) Matrix multiply instruction specifying:

a left input linear array (or a set of linear arrays) in one of the storage arrays 90 (A1Hm or A1Vm in the above example);

a right input linear array (or a set of linear arrays) in another (different) one of the storage arrays 90 (A1Hm or A1Vm in the above example);

an output linear array (or a set of linear arrays) to store the result of the multiply operation (or a scalar register could be specified in the particular case of a single linear array multiplied by a single linear array)

optionally a parameter defining the granularity of access (see above)

(d) Matrix Multiply-Accumulate Instruction (described further below)

At least some of these instructions provide examples of a data retrieval instruction that has an associated instruction parameter to specify an array direction by which the instruction processing circuitry accesses (in examples, retrieves), as a linear array, a set of n storage locations.

At least some of these instructions provide examples of a matrix processing instruction defining a matrix processing operation to generate output data in dependence upon respective input matrices of data items stored in respective ones of the two or more arrays of n×n storage locations. In such examples, the matrix processing operation may define an operation between rows or columns of data items of one of the input matrices and rows or columns of data items of another of the input matrices; and the matrix processing instruction may have an associated instruction parameter to specify, for each of the respective arrays of n×n storage locations storing the input matrices of data items, an array direction by which the instruction decoder circuitry is to control the instruction processing circuitry to retrieve linear arrays from the array of storage locations. In some examples, the matrix processing operation may be a matrix multiplication operation to generate an element of an output matrix in dependence upon an operation between elements of one of rows and columns of data items of one of the input matrices and the other of rows and columns of data items of another of the input matrices.

An example use of this type of technique relates to matrix processing operations. FIG. 5a-5e illustrate schematically a simplified and specific example, namely vector multiplication, whereas FIGS. 6a-6e represent a more general situation of matrix processing functions.

Figure 5A:
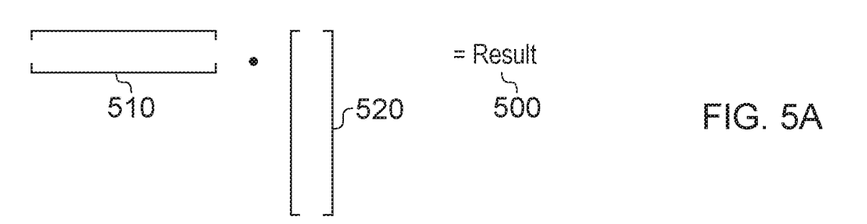
FIGS. 5a-5e schematically illustrate an example of vector multiplication.

Referring to FIG. 5a, in order to generate the result 500 of a vector multiplication of one input vector 510 with another input vector 520, a so-called dot product is used whereby successive elements of the input vector 510, for example progressing from left to right as drawn, are multiplied by respective elements of the input vector 520, for example progressing from top to bottom as drawn, with the results being the sum of each of those individual products.

Figure 3:
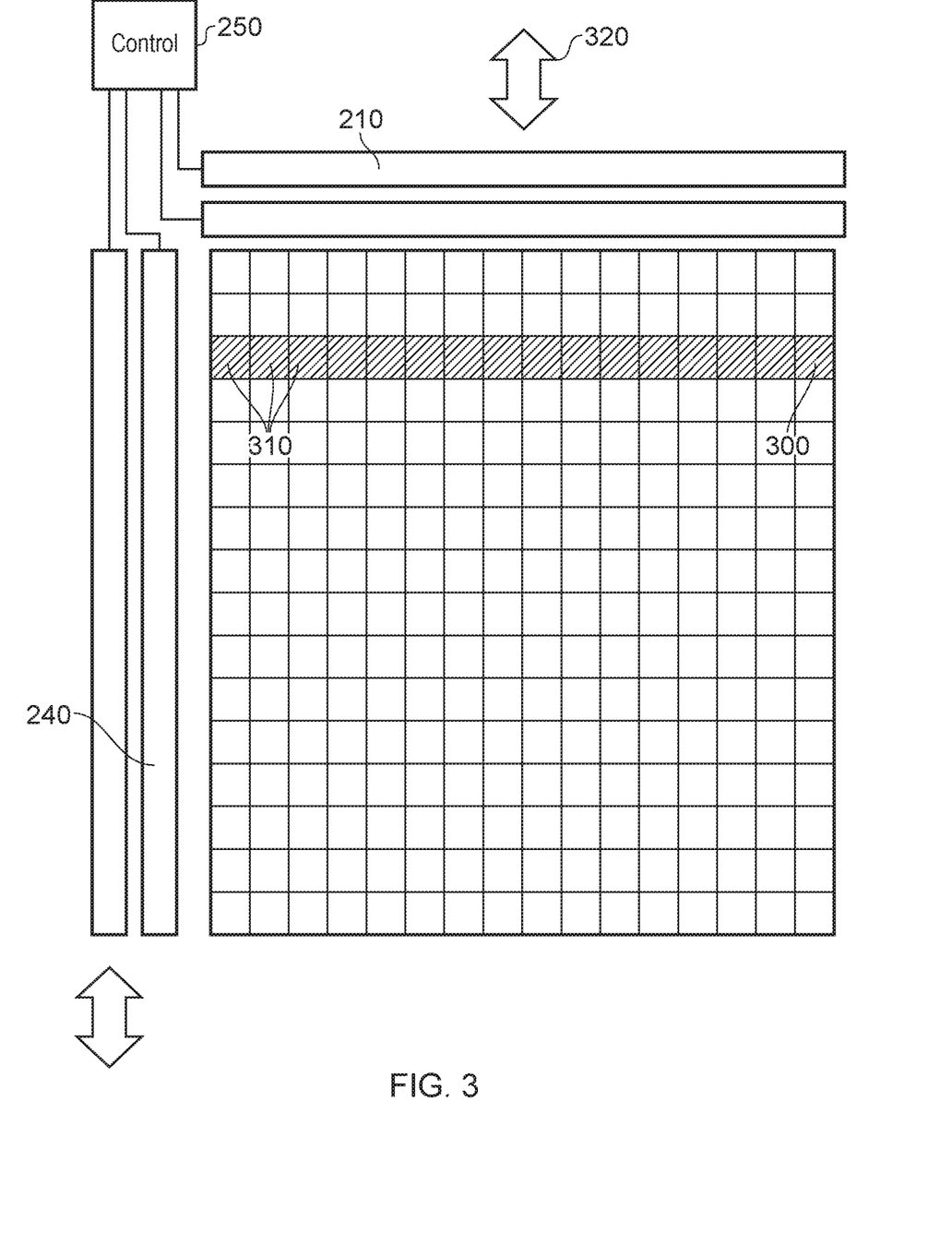

Such an arrangement can be implemented using the storage arrays 90 described with reference to FIGS. 2-4. For example, two or more storage arrays 90 of n×n storage locations may be provided, with a pair 530, 540 of such arrays being used in the present examples.

Figure 5B:
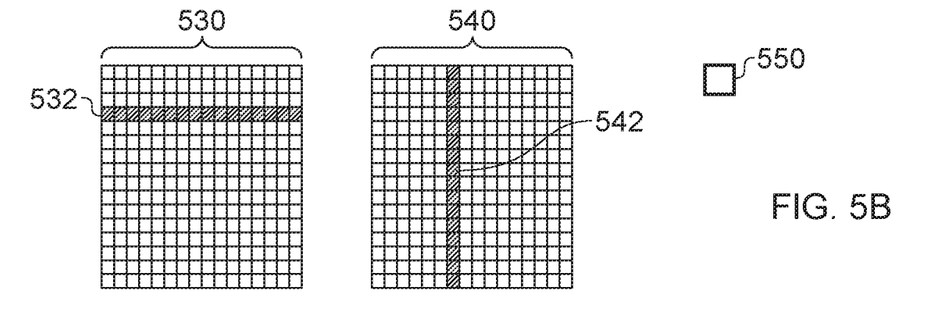

In FIG. 5b, the input vector 510 is retrieved from an arbitrary one 532 of the linear arrays in a first direction and the input vector 520 is retrieved from an arbitrary one 542 of the linear arrays 540 in a second direction. A scalar register 550 may be used to store the scalar result of the dot product operation.

Figure 5C:
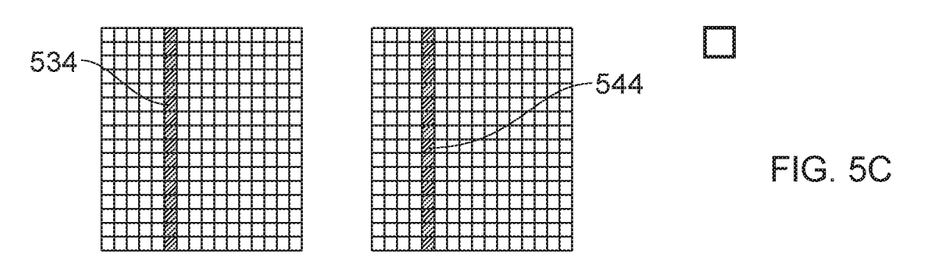

However, even though the vector multiplication shown schematically in FIG. 5a involves multiplying a row 510 by a column 520, the flexibility provided by the storage array arrangement of the present example allows other permutations to be implemented in the array of storage locations. For example, in the array 530, the linear array 510 can in fact be represented by a linear array in the second direction 534 while the column 520 is also represented by a linear array 544 in the second direction.

Figure 5D:
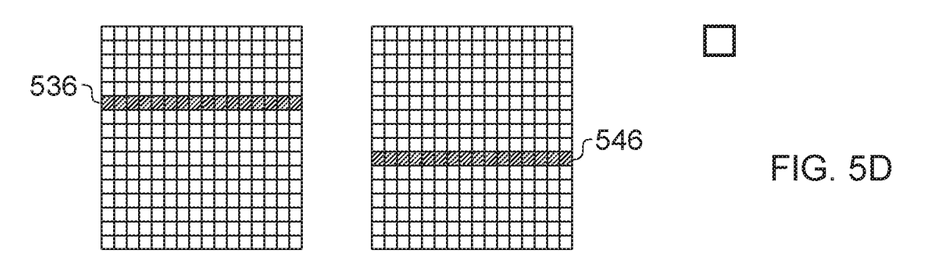
Figure 5E:
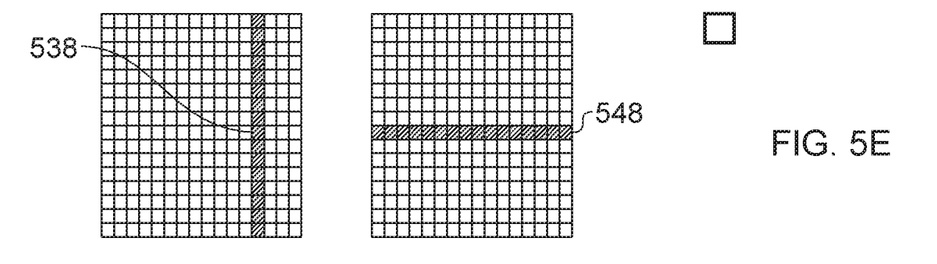

In the example of FIG. 5d, both of the linear arrays 510, 520 can be represented in the first direction, and in the schematic example of FIG. 5e, the row 510 is represented by a linear array 538 in the second direction whereas the column 520 is represented by a linear array 548 in the first direction.

These techniques can be particularly useful in the example instance of matrix multiplication, in which (FIG. 6a) a left matrix 600 is multiplied by a right matrix 610 to generate an output or product matrix 620. Each matrix element 622 of the output matrix 620 is generated by a dot product of a row 602 of the left matrix and a column 612 of the right matrix. A dot product of the type described above is carried out between the row 602 and with the column 612 to generate the single element 622 which is populated into a location in the output matrix represented by the intersection of the row 602 and the column 612.

Figure 6A:
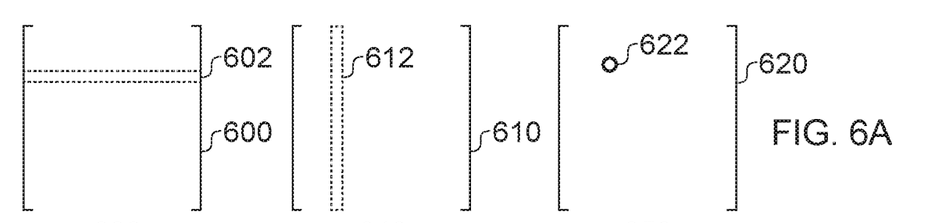
FIGS. 6a-6e schematically illustrate an example of matrix multiplication.
Figure 6B:
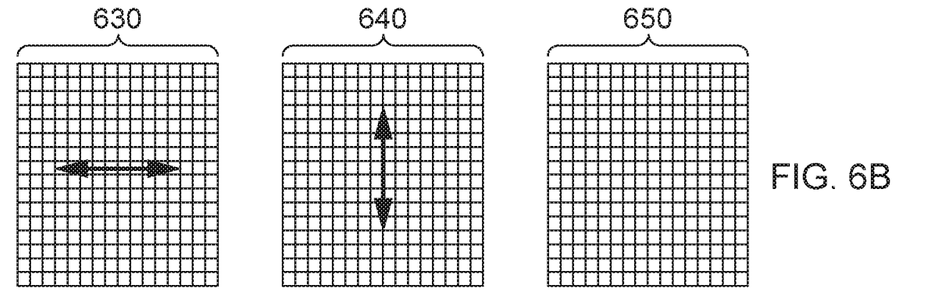

In terms of implementing this type of matrix processing function using first and second input arrays 630, 640, the way in which each of the input matrices 600, 610 is written into the storage arrays 630, 640 can depend upon how the underlying data representing the matrices is stored in memory, for example as a so-called row major format (row by row) or a so-called column major format (column by column). In some examples, whatever the formatting memory, data is written into the storage arrays 630, 640 in the first direction (horizontally oriented linear arrays as drawn) but in other examples, there could be complete flexibility (as between the first and second directions) as to which linear arrays of the 2n linear arrays should be used to load the input matrices 600, 610.

Figure 6C:
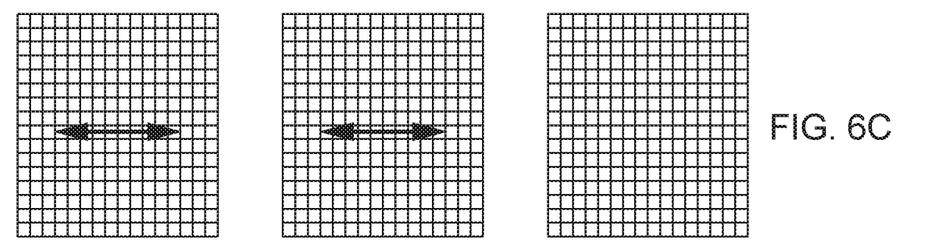
Figure 6D:
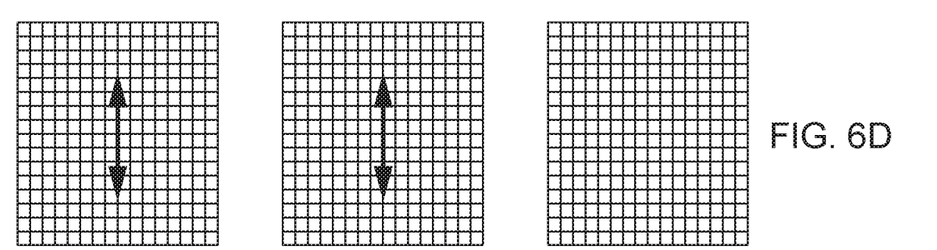
Figure 6E:
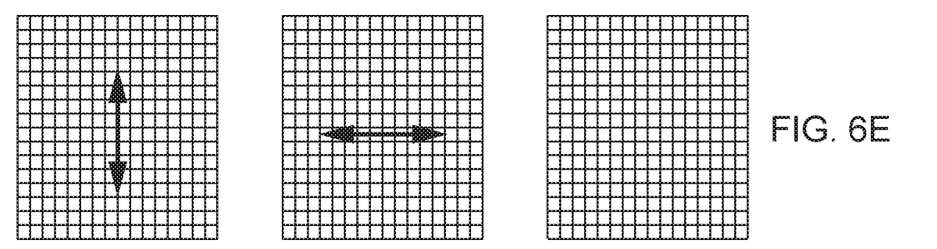

The result is that, as shown in the permutations of FIGS. 6b-6e, the input matrix 600 could be represented so that each row is stored in a linear array in the first direction (FIGS. 6b, 6c) or as a linear array in the second direction (FIGS. 6d, 6e), and the input matrix 610 is represented so that each column is stored as a linear array in the second direction (FIGS. 6b, 6d) or as a linear array in the first direction (FIGS. 6c and 6e).

Note that the storage array 650 used to represent the output or product matrix 620 do not necessarily need to provide the multi-directional access functionality discussed above with reference to the storage arrays 630, 640, but in some examples they could provide this functionality.

In other examples a so-called matrix multiply accumulate (MMLA) instruction may be used.

Figure 7A:
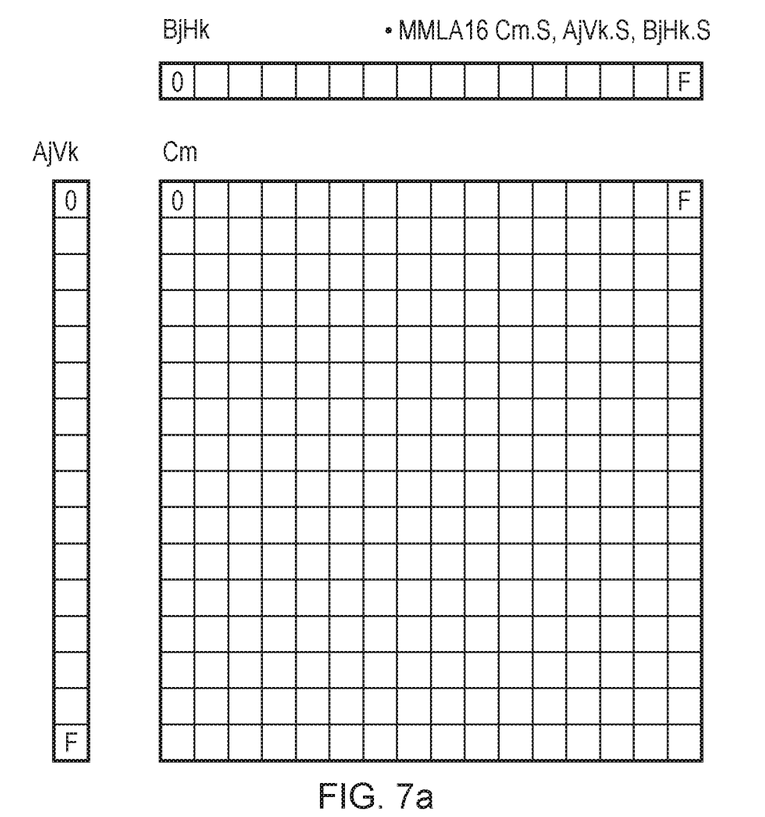
FIGS. 7a-7f schematically illustrate the use of a matrix multiply accumulate (MMLA) instruction.

FIG. 7a provides a schematic illustration of this technique. Such an instruction may generate an output matrix C by adding the result of the outer product of input matrix A column and input matrix B row to the previous value in the output matrix, so as to provide a matrix multiply and accumulate operation (e.g. $Cm'=Cm+AiVk\times BjHk$).

A set of input matrices (or parts of larger matrices) can be loaded from memory into input arrays Ai, Bj using any of the techniques described here. In operation, One MMLA instruction takes one AiVk and one BjHk as sources and generates n×n products which are accumulated in the output array Cm. For example, if n=16 and the two input arrays are A0, B0 then for a particular instance of the MMLA instruction, 256 (16×16) multiply-accumulate operations are carried out. For example, an output array element $CO'(n,m)=CO(n,m)+(A0Vk(n)*B0Hk(m))$ for each n and m=0, . . . , 15.

These MMLA operations provide 256 products (in the 16×16 example) for two input 16-element linear arrays, and so are potentially efficient in situations where a load bandwidth is limited or a high latency is associated with load operations that populated the 16×16 storage arrays from which the linear arrays are retrieved.

The result of the MMLA instruction may be useful in its own right. That is to say, it is not in fact a requirement that the MMLA operation is subject to multiple iterations in a looped manner. However, in other examples, a mathematical matrix multiplication of the type described with reference to FIGS. 6a-6e may be implemented by repeated looped operation of the MMLA instruction.

FIGS. 7b to 7f provide a similar representation to that of FIGS. 6a to 6e.

Figure 7B:
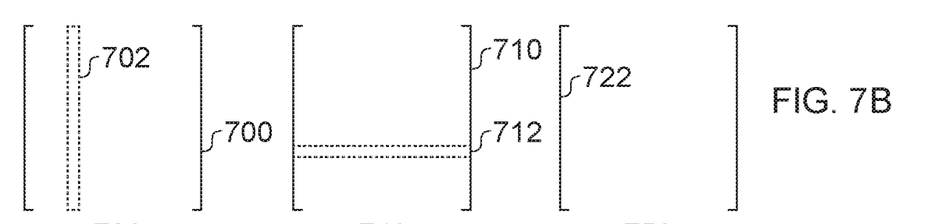
Figure 7C:
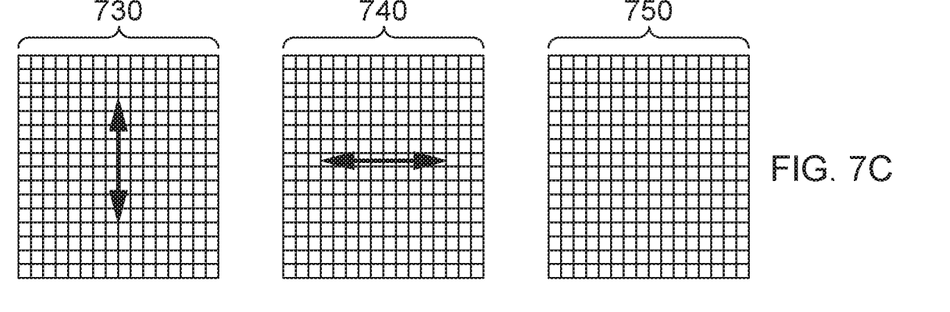
Figure 7D:
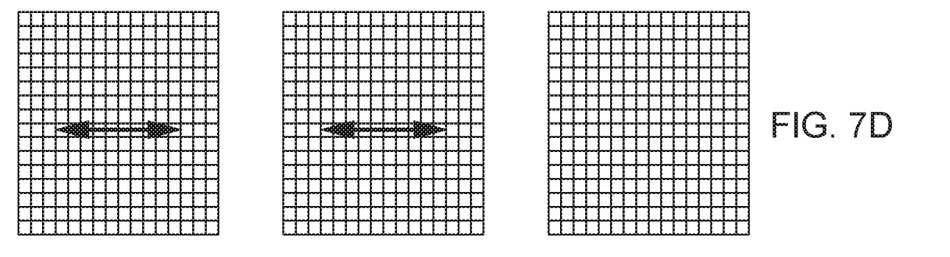
Figure 7E:
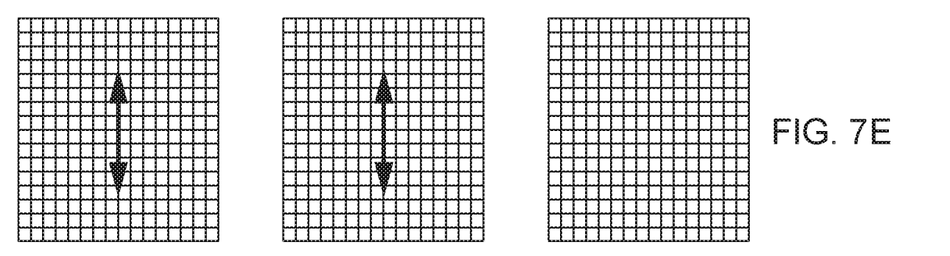
Figure 7F:
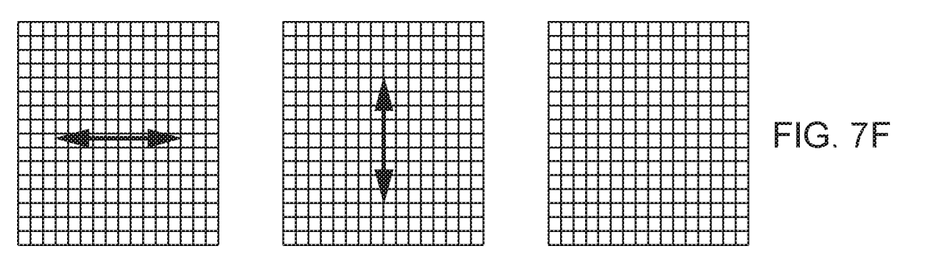

Referring to FIG. 7b, the data AjVk is represented by a column 702 of an input matrix 700, and the data BjHk is represented by a row 712 of an input matrix 710. The multiply-accumulate product is represented by an output matrix Cm 722.

In a similar manner to that of FIGS. 6b-6e, FIGS. 7c-7f illustrate that, for data arrays 730, 740, the data forming the inputs to the MMLA instruction can represent respective rows or columns in any permutation, enabled by the on-the-fly transposition provided by the functionality described here.

In various embodiments the arrays can be implemented as any one or more of the following: architecturally-addressable registers; non-architecturally-addressable registers; a scratchpad memory; and a cache.

Figure 8:
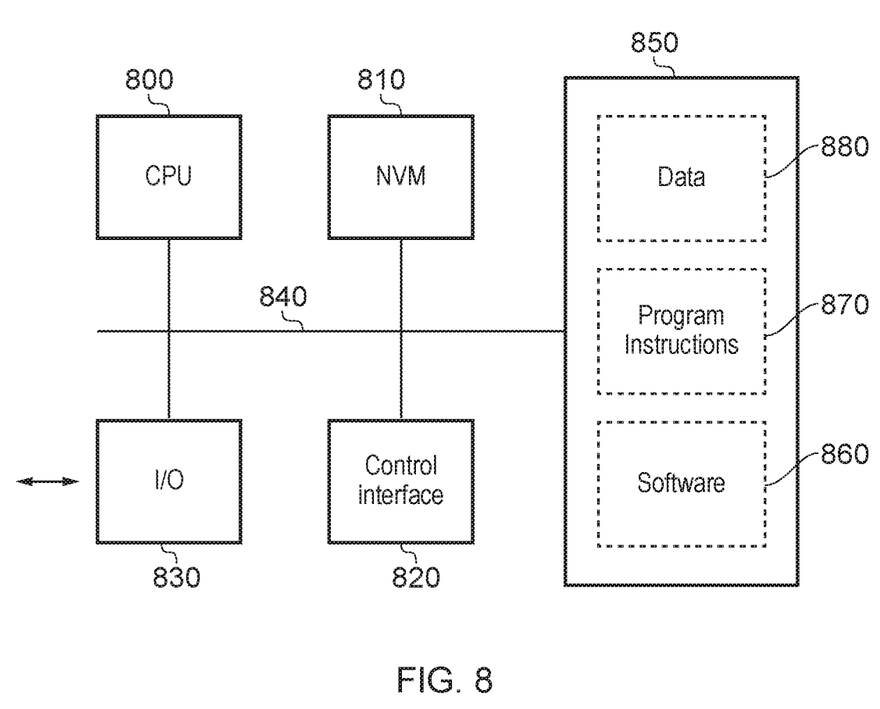
FIG. 8 schematically illustrates a virtual machine.

FIG. 8 schematically illustrates a virtual machine by which some or all of the functionality discussed above may be provided. The virtual machine comprises a central processing unit (CPU) as an example of data processing circuitry 800, a non-volatile memory 810, a control interface 820 and an input/output (IO) interface 830, all interconnected by a bus arrangement 840. A random access memory (RAM) 850 stores program instructions providing software 860 to control operations of the CPU 800. Under the control of the software 860, the CPU 800 provides or emulates the functionality of one or more of the processing instructions discussed above. The RAM 850 also stores program instructions 870 and data 880, where the program instructions 870 are instructions applicable to the processor 20 of FIG. 1 and which are interpreted, emulated or otherwise executed by the CPU 800 acting as a virtual machine. The data 880 is data corresponding to the data 32 of FIG. 1 to be acted upon by (virtual) execution of the program instructions 870. The arrangement of FIG. 8 therefore provides an example of a virtual machine comprising a data processor (such as the CPU 800) to execute a computer program comprising machine readable instructions (for example the software 860), in which execution of the computer program causes the data processor to operate as a data processing apparatus of the type described above. Example embodiments are also represented by computer software which, when executed by a computer, causes the computer to carry out one or more of the techniques described here including the method of FIG. 9, and by a non-transitory machine readable storage medium which stores such computer software.

Figure 9:
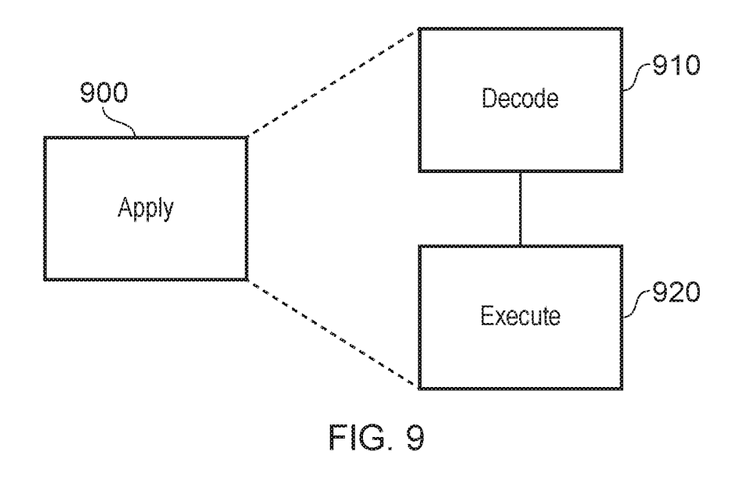
FIG. 9 is a schematic flowchart representing a method.

By way of summary, FIG. 9 is a schematic flowchart illustrating a data processing method comprising:

applying (at a step 900) processing operations to one or more data items of a linear array comprising a plurality, n, of data items at respective positions in the linear array, by accessing an array of n×n storage locations, where n is an integer greater than one, the applying step comprising:

decoding (at a step 910) program instructions; and executing (at a step 920) instructions decoded by the decoding step;

wherein the decoding step is responsive to an array access instruction, to control the executing step to access, as a linear array, a set of n storage locations arranged in an array direction selected, under control of the array access instruction, from a set of candidate array directions comprising at least a first array direction and a second array direction different to the first array direction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing apparatus comprising:
processing circuitry to apply processing operations to one or more data items of a linear array comprising a plurality, n, of data items at respective positions in the linear array, the processing circuitry being configured to access an array of n×n storage locations, where n is an integer greater than one, the processing circuitry comprising:
instruction decoder circuitry to decode program instructions; and
instruction processing circuitry to execute instructions decoded by the instruction decoder circuitry;
wherein:
the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction;

the instruction processing circuitry is configured to store an input vector to the array of storage locations as a group of n storage locations arranged in the first array direction; and is responsive to a data retrieval instruction, to retrieve, as a linear array, a set of n storage locations arranged in an array direction selected, under control of the data retrieval instruction, from the set of candidate array directions;

the first array direction is a predetermined array direction; and the data retrieval instruction has an associated instruction parameter to specify an array direction by which the instruction processing circuitry accesses, as a linear array, a set of n storage locations.

2. The data processing apparatus of claim 1, wherein the second array direction is orthogonal to the first array direction.

3. The data processing apparatus of claim 1, comprising two or more arrays of n×n storage locations.

4. The data processing apparatus of claim 3, wherein the array access instruction comprises a matrix processing instruction defining a matrix processing operation to generate output data in dependence upon respective input matrices of data items stored in respective ones of the two or more arrays of n×n storage locations.

5. The data processing apparatus of claim 4, wherein:
the matrix processing operation defines an operation between rows or columns of data items of one of the input matrices and rows or columns of data items of another of the input matrices; and
the matrix processing instruction has an associated instruction parameter to specify, for each of the respective arrays of n×n storage locations storing the input matrices of data items, an array direction by which the instruction decoder circuitry is to control the instruction processing circuitry to retrieve linear arrays from the array of storage locations.

6. The data processing apparatus of claim 5, wherein the matrix processing operation is a matrix multiplication operation to generate an element of an output matrix in dependence upon an operation between elements of one of rows and columns of data items of one of the input matrices and the other of rows and columns of data items of another of the input matrices.

7. The data processing apparatus of claim 2, wherein the array of n×n storage locations comprises an array of storage elements accessible by the instruction processing circuitry as 2n linear arrays, the 2n linear arrays comprising n linear arrays in the first array direction and n linear arrays in the second array direction, each linear array containing n data items.

8. The data processing apparatus of claim 7, wherein the array access instruction specifies one or more of the 2n linear arrays.

9. The data processing apparatus of claim 1, in which the data structure holding circuitry comprises at least one of: architecturally-addressable registers; non-architecturally-addressable registers; a scratchpad memory; and a cache.

10. The data processing apparatus of claim 1, wherein n is equal to 16.

11. A data processing method comprising:
applying processing operations to one or more data items of a linear array comprising a plurality, n, of data items at respective positions in the linear array, by accessing an array of n×n storage locations, where n is an integer greater than one, the applying step comprising:
decoding program instructions; and
executing instructions decoded by the decoding step;
wherein:
the decoding step is responsive to an array access instruction, to control the executing step to access, as a linear array, a set of n storage locations arranged in an array direction selected, under control of the array access instruction, from a set of candidate array directions comprising at least a first array direction and a second array direction different to the first array direction;
the executing step comprises storing an input vector to the array of storage locations as a group of n storage locations arranged in the first array direction, and in response to a data retrieval instruction, retrieving, as a linear array, a set of n storage locations arranged in an array direction selected, under control of the data retrieval instruction, from the set of candidate array directions;
the first array direction is a predetermined array direction; and
the data retrieval instruction has an associated instruction parameter to specify an array direction by which the instruction processing circuitry accesses, as a linear array, a set of n storage locations.

12. A non-transitory, computer-readable storage medium storing computer software, which when executed by a computer, causes the computer to perform a data processing method comprising:
applying processing operations to one or more data items of a linear array comprising a plurality, n, of data items at respective positions in the linear array, by accessing an array of n×n storage locations, where n is an integer greater than one, the applying step comprising:
decoding program instructions; and
executing instructions decoded by the decoding step;
wherein the decoding step is responsive to an array access instruction, to control the executing step to access, as a linear array, a set of n storage locations arranged in an array direction selected, under control of the array access instruction, from a set of candidate array directions comprising at least a first array direction and a second array direction different to the first array direction;
the executing step comprises storing an input vector to the array of storage locations as a group of n storage locations arranged in the first array direction, and in response to a data retrieval instruction, retrieving, as a linear array, a set of n storage locations arranged in an array direction selected, under control of the data retrieval instruction, from the set of candidate array directions;
the first array direction is a predetermined array direction; and
the data retrieval instruction has an associated instruction parameter to specify an array direction by which the instruction processing circuitry accesses, as a linear array, a set of n storage locations.

13. A virtual machine comprising a data processor to execute a computer program comprising machine readable instructions, wherein execution of the computer program causes the data processor to operate as a data processing apparatus comprising:

processing circuitry to apply processing operations to one or more data items of a linear array comprising a plurality, n, of data items at respective positions in the linear array, the processing circuitry being configured to access an array of n×n storage locations, where n is an integer greater than one, the processing circuitry comprising:

instruction decoder circuitry to decode program instructions; and instruction processing circuitry to execute instructions decoded by the instruction decoder circuitry;

wherein:

the instruction decoder circuitry is responsive to an array access instruction, to control the instruction processing circuitry to access, as a linear array, a set of n storage locations arranged in an array direction selected, under control of the array access instruction, from a set of candidate array directions comprising at least a first array direction and a second array direction different to the first array direction;

the instruction processing circuitry is configured to store an input vector to the array of storage locations as a group of n storage locations arranged in the first array direction; and is responsive to a data retrieval instruction, to retrieve, as a linear array, a set of n storage locations arranged in an array direction selected, under control of the data retrieval instruction, from the set of candidate array directions;

the first array direction is a predetermined array direction; and the data retrieval instruction has an associated instruction parameter to specify an array direction by which the instruction processing circuitry accesses, as a linear array, a set of n storage locations.

* * * * *